(12) United States Patent
Kimura

(10) Patent No.: US 10,442,319 B2
(45) Date of Patent: Oct. 15, 2019

(54) VEHICLE SEAT

(71) Applicant: TOYOTA BOSHOKU KABUSHIKI KAISHA, Aichi-ken (JP)

(72) Inventor: Koji Kimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/970,123

(22) Filed: May 3, 2018

(65) Prior Publication Data
US 2018/0339607 A1 Nov. 29, 2018

(30) Foreign Application Priority Data
May 25, 2017 (JP) .................. 2017-103846

(51) Int. Cl.
| | |
|---|---|
| *B60N 2/06* | (2006.01) |
| *B60N 2/07* | (2006.01) |
| *B60N 2/68* | (2006.01) |
| *B60N 2/015* | (2006.01) |
| *B60N 2/42* | (2006.01) |

(52) U.S. Cl.
CPC ....... *B60N 2/0722* (2013.01); *B60N 2/01575* (2013.01); *B60N 2/06* (2013.01); *B60N 2/065* (2013.01); *B60N 2/0732* (2013.01); *B60N 2/4221* (2013.01); *B60N 2/4228* (2013.01); *B60N 2/4249* (2013.01); *B60N 2/68* (2013.01); *B60N 2/682* (2013.01)

(58) Field of Classification Search
CPC .......... B60N 2/06; B60N 2/062; B60N 2/065; B60N 2/682; B60N 2/01575; B60N 2/0732
See application file for complete search history.

(56) References Cited

U.S. PATENT DOCUMENTS

| | | | | |
|---|---|---|---|---|
| 5,938,265 | A * | 8/1999 | Oyabu | B60N 2/4235 296/68.1 |
| 5,964,441 | A * | 10/1999 | Gauger | B60N 2/161 248/421 |
| 6,231,125 | B1 * | 5/2001 | Maeda | A47C 7/282 297/452.56 |

(Continued)

FOREIGN PATENT DOCUMENTS

| | | | | |
|---|---|---|---|---|
| DE | 102005060480 A1 * | 6/2007 | ........... | B60N 2/0732 |
| DE | 102013003789 B3 * | 3/2014 | ............ | B60N 2/065 |

(Continued)

*Primary Examiner* — Timothy J Brindley
(74) *Attorney, Agent, or Firm* — Greenblum & Bernstein, P.L.C.

(57) ABSTRACT

A vehicle seat includes a back frame, a side frame, and a slider. The side frame includes a first frame member configured to couple the back frame and the slider, a second frame member disposed on one side of the first frame member in a seat width direction and configured to couple the back frame and the first frame member, and a third frame member disposed on the other side of the first frame member in the seat width direction and configured to couple the slider and the first frame member. The side frame is provided such that the first frame member, the second frame member and the third frame member are arranged in the seat width direction at least in a portion between the back frame and the slider.

4 Claims, 8 Drawing Sheets

(56) References Cited

U.S. PATENT DOCUMENTS

| | | | | |
|---|---|---|---|---|
| 2004/0212237 | A1* | 10/2004 | Epaud | B60N 2/06 297/331 |
| 2006/0119155 | A1* | 6/2006 | Huxter | B60N 2/06 297/331 |
| 2008/0309144 | A1* | 12/2008 | Hori | B60N 2/3013 297/452.59 |
| 2010/0187887 | A1* | 7/2010 | Yamada | B60N 2/22 297/354.12 |
| 2010/0187893 | A1* | 7/2010 | Yamada | B60N 2/682 297/452.18 |
| 2012/0007406 | A1* | 1/2012 | Yamamoto | B60N 2/065 297/452.18 |
| 2012/0256457 | A1* | 10/2012 | Cailleteau | B60N 2/045 297/313 |
| 2014/0232163 | A1* | 8/2014 | Eckhoff | B60N 2/68 297/452.19 |
| 2016/0176318 | A1* | 6/2016 | Poulos | B60N 2/12 297/235 |
| 2016/0325659 | A1* | 11/2016 | Taguchi | B60N 2/5825 |
| 2017/0028892 | A1* | 2/2017 | Matsui | B60N 2/682 |
| 2017/0246966 | A1* | 8/2017 | Hayashi | B60N 2/002 |
| 2019/0070977 | A1* | 3/2019 | Shinozaki | B60N 2/015 |

FOREIGN PATENT DOCUMENTS

| | | | | |
|---|---|---|---|---|
| DE | 102015223221 A1 * | 6/2016 | | B60N 2/06 |
| JP | 6-53280 | 7/1994 | | |
| JP | 2013132917 A * | 7/2013 | | B60N 2/68 |
| JP | 2018199362 A * | 12/2018 | | B60N 2/0722 |
| WO | WO-03091061 A1 * | 11/2003 | | B60N 2/065 |
| WO | WO-2013161620 A1 * | 10/2013 | | B60N 2/682 |

* cited by examiner

VEHICLE SEAT

The present application claims priority to Japanese Patent Application No. 2017-103846 filed on May 25, 2017 with the Japan Patent Office, the entire contents of which are hereby incorporated by reference.

BACKGROUND

Field

The present disclosure relates to a vehicle seat.

Description of the Background Art

Regarding conventional vehicle seats, for example, Japanese Utility Model Laying-Open No. 06-53280 discloses a rotating seat intended to allow a large load to efficiently and smoothly escape to a vehicle body, and to improve the safety and the reliability for aiming at increasing the strength.

The rotating seat disclosed in Japanese Utility Model Laying-Open No. 06-53280 includes: a turn base fixed onto a vehicle floor; a turntable rotatably supported by the turn base; and a seat unit mounted on the turntable. An anchor plate configured to support a seat belt and a belt hook are integrally fixed to the turntable. The turn base is provided with a base hook onto which the belt hook can be hooked.

SUMMARY

As disclosed in the above-mentioned Japanese Utility Model Laying-Open No. 06-53280, a vehicle seat placed on the vehicle floor is known. Such a vehicle seat has a structure in which a back frame constituting the framework of a seat back and a slider used for installing a seat so as to be slidable relative to the vehicle floor are coupled through a frame member (a coupling frame).

In this case, for example, at the time of frontal collision of the vehicle, the vehicle's occupant who sits on a seat leans forward, so that a seat belt pulls the back frame in the forward direction of the vehicle. Also, at the time of rear collision, the vehicle's occupant who sits on the seat pushes the back frame in the backward direction of the vehicle. As a result of the above-described situations, various loads such as twisting, tension, compression or a lateral load are applied from the back frame to the coupling frame, so that the coupling frame may be deformed.

Thus, an object of the present disclosure is to solve the above-described problems and to provide a vehicle seat exhibiting a high resistance also when receiving an excessive load from the outside.

A vehicle seat according to the present disclosure includes: a back frame; a coupling frame; and a slider used for installing the coupling frame so as to be slidable relative to a vehicle floor. The coupling frame includes a first frame member configured to couple the back frame and the slider, a second frame member disposed on one side of the first frame member in a seat width direction and configured to couple the back frame and the first frame member, and a third frame member disposed on the other side of the first frame member in the seat width direction and configured to couple the slider and the first frame member. The coupling frame is provided such that the first frame member, the second frame member and the third frame member are arranged in the seat width direction at least in a portion between the back frame and the slider.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
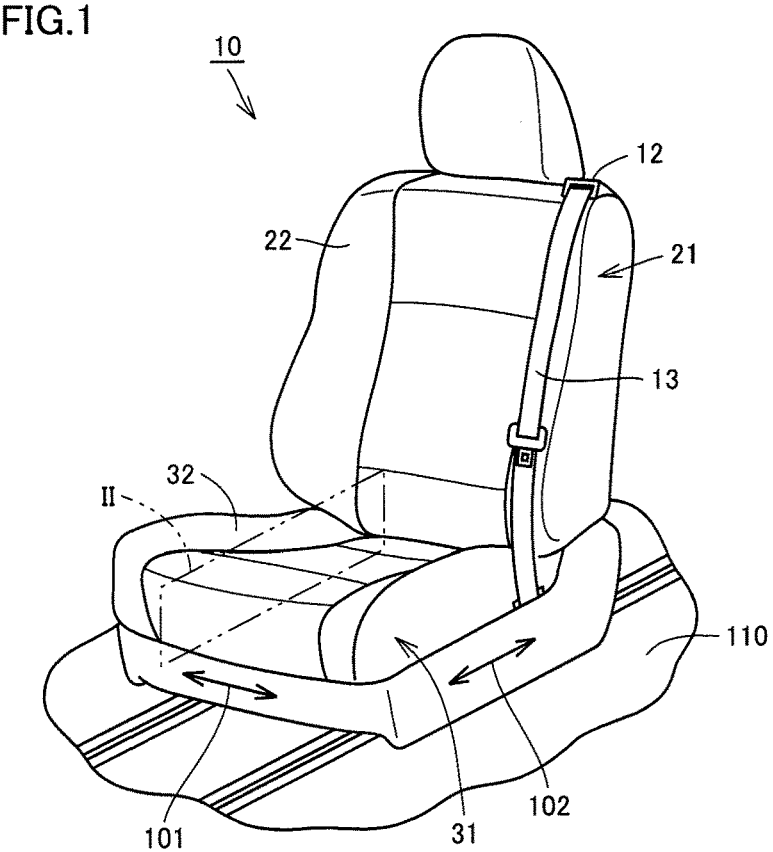
FIG. 1 is a schematic perspective view showing a vehicle seat in the first embodiment of the present disclosure.

Embodiments of the present disclosure will be hereinafter described with reference to the accompanying drawings, in which the same or corresponding components are designated by the same reference characters.

(First Embodiment)

Figure 2:
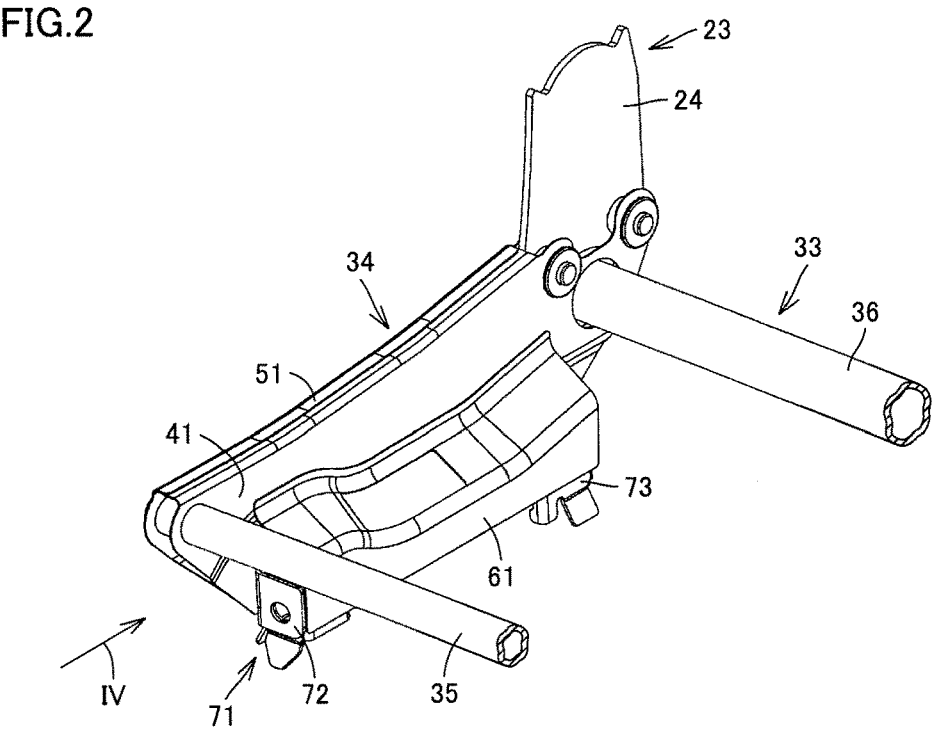
FIG. 2 is a perspective view showing the internal structure of the vehicle seat, which is located at the position surrounded by a two-dot chain line II in FIG. 1.

FIG. 1 is a schematic perspective view showing a vehicle seat in the first embodiment of the present disclosure. FIG. 2 is a perspective view showing the internal structure of the vehicle seat, which is located at the position surrounded by a two-dot chain line II in FIG. 1.

Referring to FIGS. 1 and 2, a vehicle seat 10 in the present embodiment is a seat mounted in an automobile. Vehicle seat 10 is a right-and-left side independent-type rear seat (backseat).

First, the entire structure of vehicle seat 10 will be hereinafter described. Vehicle seat 10 includes a seat cushion 31 and a seat back 21. Seat cushion 31 is a seat part configured to support the vehicle's occupant from below. Seat cushion 31 is provided on a floor 110 inside a vehicle cabin. Seat back 21 is a seat part configured to support the occupant's back. Seat back 21 is provided so as to extend upward from the end of seat cushion 31 on the rear side of the seat.

Seat cushion 31 includes a cushion frame 33, a cushion pad (not shown), and a cushion cover 32.

Cushion frame 33 forms the framework of seat cushion 31. Cushion frame 33 includes a pair of side frames 34 (FIG. 2 shows only one of the pair of side frames 34), a front pipe 35, and a rear pipe 36.

The pair of side frames 34 is arranged such that side frames 34 are spaced apart from each other in the seat width direction (the direction indicated by an arrow 101 in FIG. 1). Each side frame 34 extends in the seat front-rear direction (the direction indicated by an arrow 102 in FIG. 1). Front pipe 35 and rear pipe 36 extend in the seat width direction. Front pipe 35 is provided so as to bridge the space between the pair of side frames 34 on the front side of the seat. Rear pipe 36 is provided so as to bridge the space between the pair of side frames 34 on the rear side of the seat. The pair of side frames 34, front pipe 35 and rear pipe 36 form an approximately rectangular frame shape.

The cushion pad is provided on cushion frame 33. The cushion pad is made of an elastic material such as urethane foam and elastically receives the weight of the vehicle's occupant who sits on vehicle seat 10. Cushion cover 32 is covered over the entire surface of the cushion pad. Cushion cover 32 is made of fabric (cloth) or leather, for example, and forms an external appearance of seat cushion 31.

Seat back 21 includes a back frame 23, a back pad (not shown), and a back cover 22.

Back frame 23 forms the framework of seat back 21. Back frame 23 includes a reclining plate 24.

Reclining plate 24 has a plate shape having a thickness direction corresponding to the seat width direction and extending in the up-down direction. Reclining plate 24 is connected on its upper end side to the side frame (not shown) of back frame 23 through a recliner (not shown). Reclining plate 24 is connected on its lower end side to side frame 34 of cushion frame 33. Reclining plate 24 is connected to the end of side frame 34 on the rear side of the seat.

The back pad is provided so as to cover back frame 23. The back pad is made of an elastic material such as urethane foam, and elastically receives the load from the vehicle's occupant. Back cover 22 is covered over the entire surface of the back pad. Back cover 22 is made of fabric (cloth) or leather, for example, and forms an external appearance of seat back 21.

Vehicle seat 10 further includes a slider 71. Slider 71 allows side frame 34 of cushion frame 33 to be installed so as to be slidable relative to floor 110. Slider 71 allows side frame 34 to be installed so as to be slidable in the seat front-rear direction relative to floor 110.

Slider 71 includes a bracket 72 and a bracket 73. Slider 71 is formed of a lower rail placed on the floor 110 side and an upper rail placed on the vehicle seat 10 side and provided so as to be slidable relative to the lower rail. Brackets 72 and 73 form the upper rail.

Brackets 72 and 73 are connected to side frame 34 of cushion frame 33. Brackets 72 and 73 are arranged so as to be spaced apart from each other in the seat front-rear direction. Bracket 72 is connected to the end of side frame 34 on the front side of the seat while bracket 73 is connected to the end of side frame 34 on the rear side of the seat. Brackets 72 and 73 are provided below reclining plate 24.

In such a configuration, side frame 34 of cushion frame 33 is provided as a coupling frame configured to couple back frame 23 (more specifically, reclining plate 24) and slider 71 (more specifically, brackets 72 and 73).

Then, the coupling structure between back frame 23 (reclining plate 24) and slider 71 (brackets 72 and 73) through side frame 34 will be hereinafter described in detail.

Figure 3:
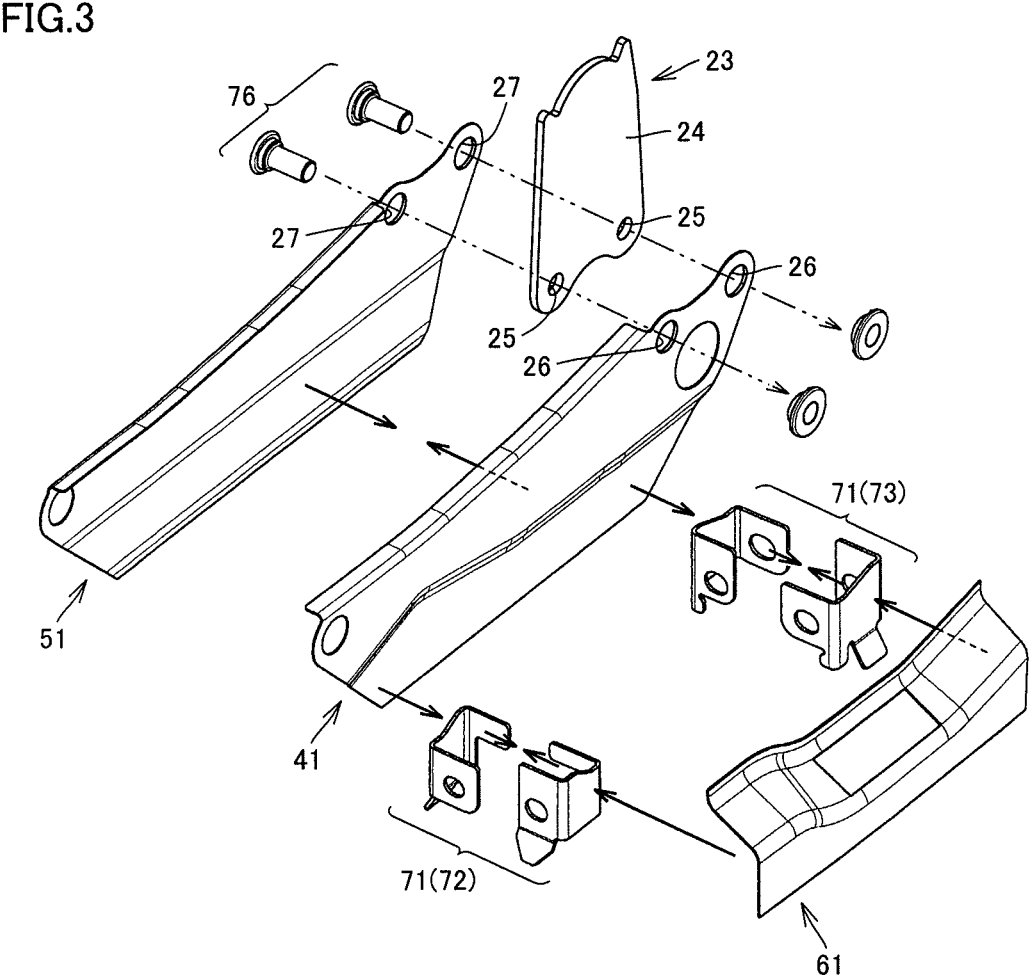
FIG. 3 is an exploded view showing the coupling structure between a back frame and a slider.
Figure 4:
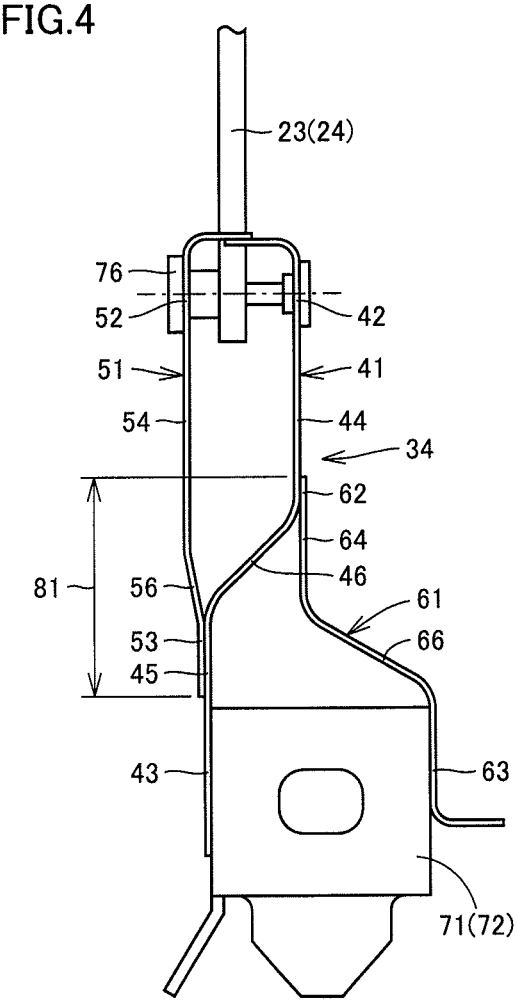
FIG. 4 is a front view showing the coupling structure between the back frame and the slider as seen in the direction indicated by an arrow IV in FIG. 2.

FIG. 3 is an exploded view showing the coupling structure between the back frame and the slider. FIG. 4 is a front view showing the coupling structure between the back frame and the slider as seen in the direction indicated by an arrow IV in FIG. 2.

Referring to FIGS. 2 to 4, the position of back frame 23 (reclining plate 24) in the seat width direction and the position of slider 71 (brackets 72 and 73) in the seat width direction overlap with each other. On the plane of sheet of paper showing FIG. 4, for example, when back frame 23 (reclining plate 24) is slid downward, it overlaps with slider 71 (brackets 72 and 73).

The center position of back frame 23 (reclining plate 24) in the seat width direction and the center position of slider 71 (brackets 72 and 73) in the seat width direction are deviated from each other. The center position of back frame 23 (reclining plate 24) in the seat width direction is located closer to the outside of vehicle seat 10 in the seat width direction than the center position of slider 71 (brackets 72 and 73) in the seat width direction.

Side frame 34 includes a first frame member 41, a second frame member 51, and a third frame member 61.

First frame member 41, second frame member 51 and third frame member 61 entirely form a plate shape that has a thickness direction corresponding to the seat width direction, a short-side direction corresponding to the up-down direction, and a long-side direction corresponding to the seat front-rear direction. In the seat front-rear direction, first frame member 41 and second frame member 51 have the same length. In the seat front-rear direction, third frame member 61 is shorter in length than first frame member 41 and second frame member 51.

First frame member 41 is disposed between second frame member 51 and third frame member 61 in the seat width direction.

Second frame member 51 is disposed on one side of first frame member 41 in the seat width direction. Second frame member 51 is attached to first frame member 41 from the outside of vehicle seat 10 in the seat width direction such that second frame member 51 and first frame member 41 overlap with each other. Second frame member 51 is attached to first frame member 41 with back frame 23 (reclining plate 24) interposed therebetween at the end of second frame member 51 on the rear side thereof such that second frame member 51 and first frame member 41 overlap with each other.

First frame member 41, second frame member 51 and reclining plate 24 are provided with a pin insertion hole 26, a pin insertion hole 27 and a pin insertion hole 25, respectively. Pin insertion hole 26, pin insertion hole 27 and pin insertion hole 25 are through holes penetrating through first frame member 41, second frame member 51 and reclining plate 24, respectively, in the seat width direction. Pin insertion hole 26, pin insertion hole 27 and pin insertion hole 25 are provided so as to linearly align in the seat width direction. A pin member 76 is inserted through pin insertion hole 26, pin insertion hole 27 and pin insertion hole 25.

The means for connecting first frame member 41, second frame member 51 and reclining plate 24 is not limited to the above-mentioned pin member 76, but may be a bolt, for example.

Third frame member 61 is disposed on the other side of first frame member 41 in the seat width direction. Third frame member 61 is attached to first frame member 41 from the inside of vehicle seat 10 in the seat width direction such that third frame member 61 and first frame member 41 overlap with each other. Third frame member 61 is attached to first frame member 41 with brackets 72 and 73 interposed therebetween at the ends of third frame member 61 in the seat front-rear direction.

First frame member 41 couples back frame 23 (reclining plate 24) and slider 71 (brackets 72 and 73).

More specifically, first frame member 41 is formed of components including a first connection portion 42, a second connection portion 43, a first planar portion 44, a second planar portion 45, and an intermediate portion 46. First connection portion 42, first planar portion 44, intermediate portion 46, second planar portion 45, and second connection portion 43 are arranged in this order from the upper side to the lower side of first frame member 41.

First connection portion 42 is connected to back frame 23 by pin member 76. Second connection portion 43 is connected to slider 71 by welding. First connection portion 42 is connected to back frame 23 from the inside of vehicle seat 10 in the seat width direction. Second connection portion 43 is connected to slider 71 from the outside of vehicle seat 10 in the seat width direction. First connection portion 42 and second connection portion 43 are connected to back frame 23 and slider 71, respectively, from the opposite sides in the seat width direction.

First planar portion 44 extends in a plane shape downward from first connection portion 42. Second planar portion 45 extends in a plane shape upward from second connection portion 43. Intermediate portion 46 is provided between first planar portion 44 and second planar portion 45. Intermediate portion 46 extends obliquely in the up-down direction between first planar portion 44 and second planar portion 45. Intermediate portion 46 is provided at the portion where there is the difference in level in the seat width direction between first connection portion 42 and second connection portion 43.

Second frame member 51 couples back frame 23 (reclining plate 24) and first frame member 41.

More specifically, second frame member 51 is formed of components including a first connection portion 52, a second connection portion 53, a first planar portion 54, and an intermediate portion 56. First connection portion 52, first planar portion 54, intermediate portion 56, and second connection portion 53 are arranged in this order from the upper side to the lower side of second frame member 51.

First connection portion 52 is connected to back frame 23 by pin member 76. Second connection portion 53 is connected to first frame member 41 by welding. Second connection portion 53 is connected to second planar portion 45 provided in first frame member 41. First connection portion 52 is connected to back frame 23 from the outside of vehicle seat 10 in the seat width direction. Second connection portion 53 is connected to first frame member 41 from the outside of vehicle seat 10 in the seat width direction. First connection portion 52 and second connection portion 53 are connected to back frame 23 and first frame member 41, respectively, from the same side in the seat width direction.

First planar portion 54 extends in a plane shape downward from first connection portion 52. Intermediate portion 56 is provided between first planar portion 44 and second connection portion 53. Intermediate portion 56 extends obliquely in the up-down direction between first planar portion 44 and second connection portion 53. Intermediate portion 56 is provided at the portion where there is the difference in level in the seat width direction between first connection portion 52 and second connection portion 53. In the seat width direction, second connection portion 43 and second connection portion 53 are located between first connection portion 42 and first connection portion 52.

Third frame member 61 couples slider 71 (brackets 72 and 73) and first frame member 41.

More specifically, third frame member 61 is formed of components including a first connection portion 62, a second connection portion 63, a first planar portion 64, and an intermediate portion 66. First connection portion 62, first planar portion 64, intermediate portion 66, and second connection portion 63 are arranged in this order from the upper side to the lower side of third frame member 61.

First connection portion 62 is connected to first frame member 41 by welding. First connection portion 62 is connected to first planar portion 44 provided in first frame member 41. Second connection portion 63 is connected to slider 71 by welding. First connection portion 62 is connected to first frame member 41 from the inside of vehicle seat 10 in the seat width direction. Second connection portion 63 is connected to slider 71 from the inside of vehicle seat 10 in the seat width direction. First connection portion 62 and second connection portion 63 are connected to first frame member 41 and slider 71, respectively, from the same side in the seat width direction.

First planar portion 64 extends in a plane shape downward from first connection portion 62. Intermediate portion 66 is provided between first planar portion 64 and second connection portion 63. Intermediate portion 66 extends obliquely in the up-down direction between first planar portion 64 and second connection portion 63. Intermediate portion 66 is provided at the portion where there is the difference in level in the seat width direction between first connection portion 62 and second connection portion 63. In the seat width direction, first connection portion 42 and first connection portion 62 are arranged between second connection portion 43 and second connection portion 63.

Side frame 34 is provided such that first frame member 41, second frame member 51 and third frame member 61 are arranged in the seat width direction at least in a portion between back frame 23 and slider 71.

More specifically, side frame 34 includes a frame overlapping portion 81. Frame overlapping portion 81 is a frame region in which first frame member 41, second frame member 51 and third frame member 61 are arranged in the seat width direction. In frame overlapping portion 81, first planar portion 44 in first frame member 41, intermediate portion 46 and second planar portion 45, first planar portion 54 in second frame member 51, intermediate portion 56 and second connection portion 53, first connection portion 62 in third frame member 61, and first planar portion 64 and intermediate portion 66 are arranged in the seat width direction.

Frame overlapping portion 81 includes intermediate portion 46, intermediate portion 56, and intermediate portion 66. Frame overlapping portion 81 is provided at the position that is closer to slider 71 than to back frame 23 in the up-down direction. Frame overlapping portion 81 may be provided at the position that is closer to back frame 23 than to slider 71 in the up-down direction.

According to the configuration as described above, back frame 23 and slider 71 are coupled by at least two frame members among first frame member 41, second frame member 51 and third frame member 61 that are spaced apart from one another in the seat width direction. Also in frame overlapping portion 81, first frame member 41 disposed between second frame member 51 and third frame member 62 that are arranged spaced apart from each other in the seat width direction functions as a beam. Thereby, the rigidity of side frame 34 serving to couple back frame 23 and slider 71 can be improved, so that side frame 34 is less likely to be deformed.

Particularly in the present embodiment, the position of back frame 23 (reclining plate 24) in the seat width direction and the position of slider 71 (brackets 72 and 73) in the seat width direction overlap with each other. By the configuration as described above, the load from back frame 23 is more linearly transmitted to slider 71 through side frame 34, so that side frame 34 is less likely to be deformed.

The following is a summarized explanation about the structure of vehicle seat 10 in the first embodiment of the present disclosure. Specifically, vehicle seat 10 in the present embodiment includes: back frame 23; side frame 34 as a coupling frame; and slider 71 used for installing side frame 34 so as to be slidable relative to floor 110 as a floor of the vehicle. Side frame 34 includes: first frame member 41 configured to couple back frame 23 and slider 71; second frame member 51 disposed on one side of first frame member 41 in the seat width direction and configured to couple back frame 23 and first frame member 41; and third frame member 61 disposed on the other side of first frame member 41 in the seat width direction and configured to couple slider 71 and first frame member 41. Side frame 34 is provided such that first frame member 41, second frame member 51 and third frame member 61 are arranged in the seat width direction at least in a portion between back frame 23 and slider 71.

According to vehicle seat 10 in the first embodiment of the present disclosure configured in this way, when loads such as twisting, tension, compression or a lateral load are applied from back frame 23 to side frame 34 at the time of frontal collision, rear collision or the like of the vehicle, deformation of side frame 34 can be suppressed. Thereby, it becomes possible to implement a vehicle seat exhibiting a high resistance also when receiving an excessive load from the outside.

The present disclosure may be applicable to a seat equipped with a tip-up mechanism in which a seat cushion is operated between the seating position and the tipped-up position. In this case, the seat is formed of: a base installed so as to be slidable relative to a vehicle floor; a seat cushion coupled to the base through the tip-up mechanism; and a seat back coupled to the rear end of the base. Also, the frame forming the framework of the base corresponds to the coupling frame in the present disclosure.

Furthermore, the seat to which the present disclosure is applicable is not limited to a rear seat, but may be a driver's seat and a passenger's seat, for example. In the present embodiment, the present disclosure is applied to a seat of an automobile, but may be a seat mounted in an airplane, a ship, an electric train, or the like.

(Second Embodiment)

In the present embodiment, various modifications of the vehicle seat having been described in the first embodiment will be described. FIGS. 5 to 9 in the present embodiment each correspond to FIG. 4 in the first embodiment.

Figure 5:
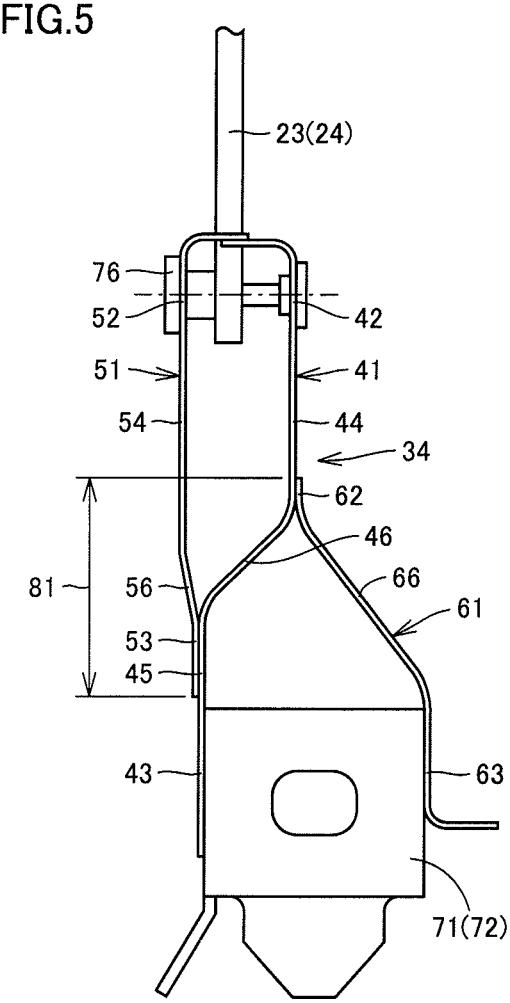
FIG. 5 is a front view showing the first modification of the vehicle seat in the first embodiment.

FIG. 5 is a front view showing the first modification of the vehicle seat in the first embodiment. Referring to FIG. 5, in the present modification, third frame member 61 is formed of components including first connection portion 62, second connection portion 63, and intermediate portion 66. Intermediate portion 66 extends obliquely in the up-down direction between first connection portion 62 and second connection portion 63.

As illustrated in the present modification, there is no specific limitation on whether each of first frame member 41, second frame member 51 and third frame member 61 includes the first planar portion and the second planar portion or not.

Figure 6:
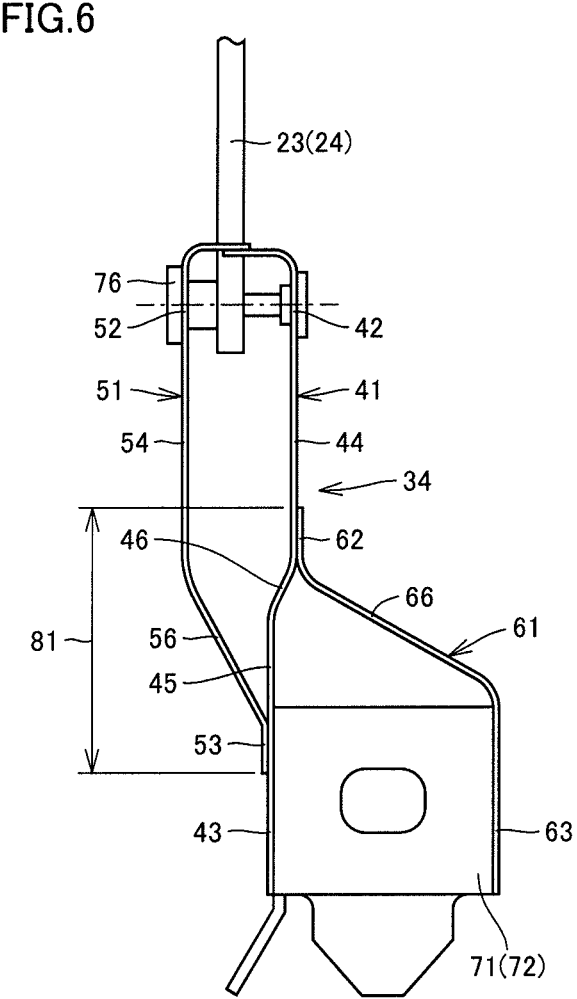
FIG. 6 is a front view showing the second modification of the vehicle seat in the first embodiment.

FIG. 6 is a front view showing the second modification of the vehicle seat in the first embodiment. Referring to FIG. 6, in the present modification, the position of back frame 23 (reclining plate 24) in the seat width direction and the position of slider 71 (brackets 72 and 73) in the seat width direction do not overlap with each other.

In such a configuration, in order to eliminate the positional deviation between back frame 23 and slider 71 in the seat width direction, intermediate portion 56 in second frame member 51 and intermediate portion 66 in third frame member 61 are increased in inclination and length. In this case, although stress is more likely to be concentrated on intermediate portion 56 and intermediate portion 66, the beam structure formed by first frame member 41 can maintain high rigidity of side frame 34.

Figure 7:
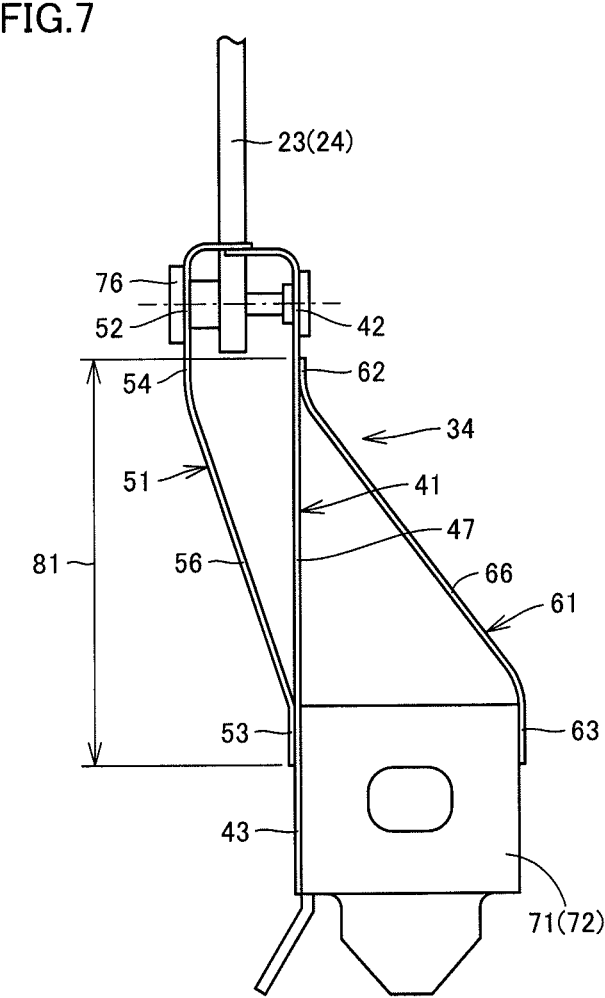
FIG. 7 is a front view showing the third modification of the vehicle seat in the first embodiment.

FIG. 7 is a front view showing the third modification of the vehicle seat in the first embodiment. Referring to FIG. 7, in the present modification, first frame member 41 is formed of components including first connection portion 42, second connection portion 43, and planar portion 47. Planar portion 47 extends in a plane shape between first connection portion 42 and second connection portion 43.

As shown in the present modification, first frame member 41 may be configured to extend in a plane shape between back frame 23 and slider 71.

Figure 8:
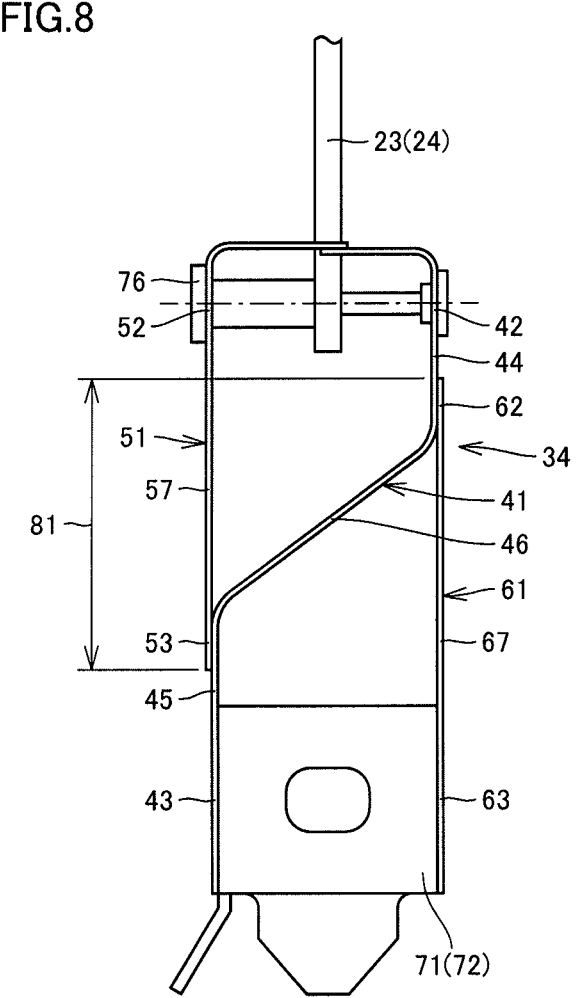
FIG. 8 is a front view showing the fourth modification of the vehicle seat in the first embodiment.

FIG. 8 is a front view showing the fourth modification of the vehicle seat in the first embodiment. Referring to FIG. 8, in the present modification, second frame member 51 is formed of components including first connection portion 52, second connection portion 53 and a planar portion 57. Planar portion 57 extends in a plane shape between first connection portion 52 and second connection portion 53. Third frame member 61 is formed of components including first connection portion 62, second connection portion 63 and a planar portion 67. Planar portion 67 extends in a plane shape between first connection portion 62 and second connection portion 63.

As shown in the present modification, second frame member 51 may be configured to extend in a plane shape between back frame 23 and first frame member 41, and third frame member 61 may be configured to extend in a plane shape between first frame member 41 and slider 71. According to such a configuration, the load from back frame 23 is more linearly transmitted to slider 71 through side frame 34, so that side frame 34 is further less likely to be deformed.

Figure 9:
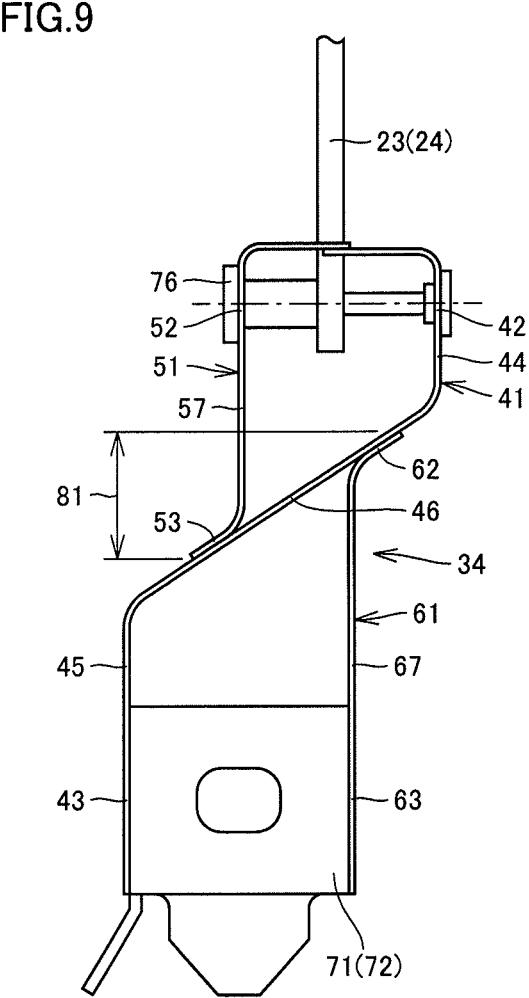
FIG. 9 is a front view showing the fifth modification of the vehicle seat in the first embodiment.

FIG. 9 is a front view showing the fifth modification of the vehicle seat in the first embodiment. Referring to FIG. 9, in the present modification, the position of back frame 23 (reclining plate 24) in the seat width direction and the position of slider 71 (brackets 72 and 73) in the seat width direction are deviated in the direction opposite to the deviated direction in the first embodiment.

Second frame member 51 is formed of components including first connection portion 52, second connection portion 53, and planar portion 57. Planar portion 57 extends in a plane shape between first connection portion 52 and second connection portion 53. Second connection portion 53 is connected to intermediate portion 46 in first frame member 41.

Third frame member 61 is formed of components including first connection portion 62, second connection portion 63, and planar portion 67. Planar portion 67 extends in a plane shape between first connection portion 62 and second connection portion 63. First connection portion 62 is connected to intermediate portion 46 in first frame member 41.

As shown in the present modification, second frame member 51 and third frame member 61 may be connected to intermediate portion 46 in first frame member 41. Furthermore, only one of second frame member 51 and third frame member 61 may be connected to intermediate portion 46 in first frame member 41.

From the viewpoint of greatly ensuring the length of frame overlapping portion 81, the connection manner in the first embodiment is more advantageous than the connection manner in the present modification.

According to the vehicle seat in the second embodiment of the present disclosure configured in this way, the effect described in the first embodiment can be similarly achieved.

A vehicle seat according to the present disclosure includes: a back frame; a coupling frame, and a slider used for installing the coupling frame to be slidable relative to a vehicle floor. The coupling frame includes: a first frame member configured to couple the back frame and the slider; a second frame member disposed on one side of the first frame member in the seat width direction and configured to couple the back frame and the first frame member; and a third frame member disposed on the other side of the first frame member in the seat width direction and configured to couple the slider and the first frame member. The coupling frame is provided such that the first frame member, the second frame member and the third frame member are arranged in the seat width direction at least in a portion between the back frame and the slider.

According to the vehicle seat configured in this way, the back frame and the slider are coupled by at least two frame members among the first frame member, the second frame member and the third frame member that are spaced apart from one another in the seat width direction. At least in a portion between the back frame and the slider, the first frame member disposed between the second frame member and the third frame member functions as a beam. Thereby, the rigidity of the coupling frame is enhanced, so that the coupling frame is less likely to be deformed. Consequently, it becomes possible to implement a vehicle seat exhibiting a high resistance also when receiving an excessive load from the outside.

Further preferably, a position of the back frame in the seat width direction and a position of the slider in the seat width direction overlap with each other.

Further preferably, the second frame member extends in a plane shape between the back frame and the first frame member. The third frame member extends in a plane shape between the slider and the first frame member.

According to the vehicle seat configured in this way, since the load from the back frame is more linearly transmitted to the slider through the coupling frame, the coupling frame is further less likely to be deformed.

The present disclosure is applicable to a seat of an automobile, for example.

Although the embodiments of the present disclosure have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A vehicle seat comprising:
   a seat back frame;
   a coupling frame; and
   a slider connected to the coupling frame such that the vehicle seat is slidable relative to a vehicle floor,
   the coupling frame including:
     a first frame member configured to couple the seat back frame and the slider;
     a second frame member disposed on one side of the first frame member in a seat width direction and configured to couple the seat back frame and the first frame member; and
     a third frame member disposed on the other side of the first frame member in the seat width direction and configured to couple the slider and the first frame member,
   the coupling frame being provided such that the first frame member, the second frame member and the third frame member are arranged in the seat width direction at least in a portion between the seat back frame and the slider.

2. The vehicle seat according to claim 1, wherein a position of the seat back frame in the seat width direction and a position of the slider in the seat width direction overlap with each other.

3. The vehicle seat according to claim 1, wherein
   the second frame member extends along a plane between the seat back frame and the first frame member, and
   the third frame member extends along a plane between the slider and the first frame member.

4. The vehicle seat according to claim 2, wherein
   the second frame member extends along a plane between the seat back frame and the first frame member, and
   the third frame member extends along a plane between the slider and the first frame member.

* * * * *